United States Patent
Fischer et al.

[11] Patent Number: 6,129,384
[45] Date of Patent: Oct. 10, 2000

[54] BOLT-ON PART, ESPECIALLY A BUMPER OF A MOTOR VEHICLE

[75] Inventors: Carola Fischer; Juergen Kipar, both of Boeblingen; Horst Kleiner, Stuttgart; Andreas Otto, Heimsheim; Josef Oravetz, Sindelfingen; Christian Lemm, Aidlingen; Dietmar Preissler, Weissenberg; Anton Sautner, Treuchtlingen, all of Germany

[73] Assignees: DaimlerChrysler AG, Stuttgart; Dynamit Nobel Kunststoff GmbH, Troisdorf, both of Germany

[21] Appl. No.: 09/055,310

[22] Filed: Apr. 6, 1998

[30] Foreign Application Priority Data

Apr. 5, 1997 [DE] Germany .............................. 197 14 118

[51] Int. Cl.⁷ ....................................................... B60R 9/02
[52] U.S. Cl. .............................................................. 280/770
[58] Field of Search ..................... 280/751, 762, 280/770, 748, 760, 768, 769, 784; 293/126, 154, 155; 296/189, 35.2; 180/232

[56] References Cited

U.S. PATENT DOCUMENTS

| | | | |
|---|---|---|---|
| 1,560,943 | 11/1925 | Sager | 293/126 |
| 1,610,598 | 12/1926 | Boscariol | 293/111.1 |
| 1,666,754 | 4/1928 | Rahe | 293/135 |
| 5,061,108 | 10/1991 | Bien et al. | |
| 5,169,204 | 12/1992 | Kelman | 296/146 |

FOREIGN PATENT DOCUMENTS

| | | |
|---|---|---|
| 58-89437 | 5/1983 | Japan . |
| 7-137585A | 5/1995 | Japan . |
| 8-91151 | 4/1996 | Japan . |

*Primary Examiner*—Lanna Mai
*Assistant Examiner*—Kevin McKinley
*Attorney, Agent, or Firm*—Evenson, McKeown, Edwards & Lenahan, P.L.L.C.

[57] ABSTRACT

A bolt-on part, especially a front or rear bumper, of a motor vehicle, that can be exposed especially in its outer wall to impact energy and is mounted pointwise on a structural member of a motor vehicle, with the connection between the structural member and the bolt-on part consisting of pin-shaped fastening devices on one of the two parts to be connected and recesses in the other of the two parts, is intended to dissipate as much deformation energy as possible by coming loose from the structural member under the influence of an impact in the lengthwise direction of the bolt-on part. For this purpose, at least one of the recesses in each case is closed circumferentially and is located at the end furthest away in the direction of action from the point where the impact energy is applied. The other recesses are open circumferentially and are in the form of grooves inclined at less than $\alpha=90°$ to the acting direction of the impact energy in such fashion that the bolt-on part that deforms under the impact energy can come loose from the structural member without deformation of the structural member, at the recesses that are formed as grooves.

16 Claims, 3 Drawing Sheets

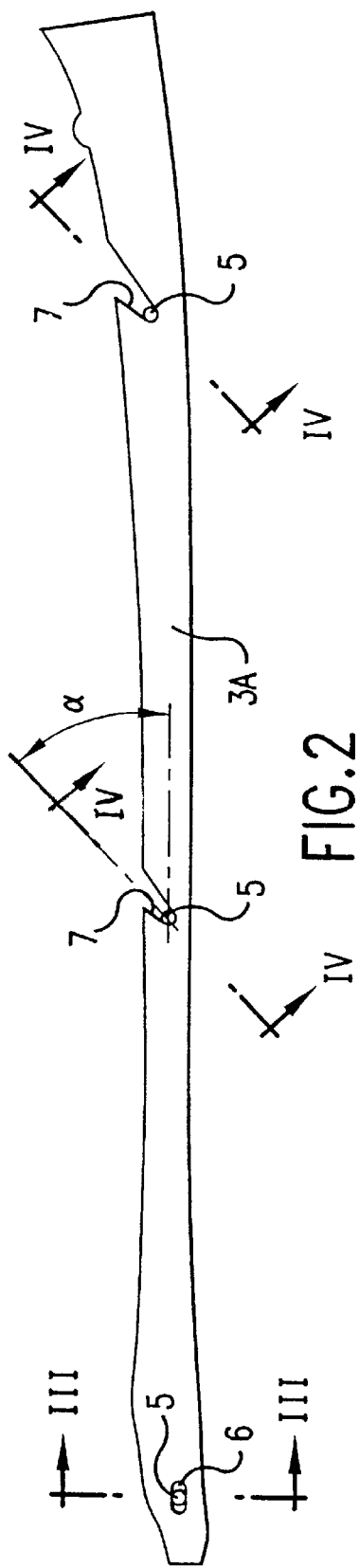
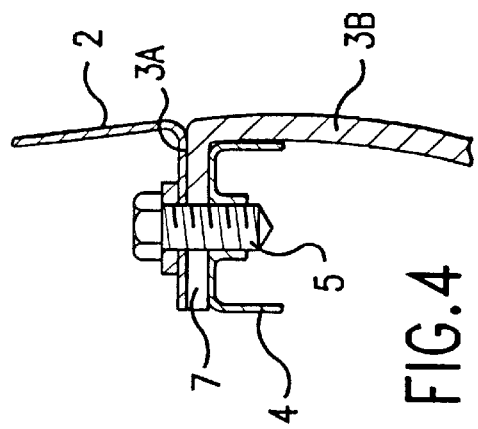
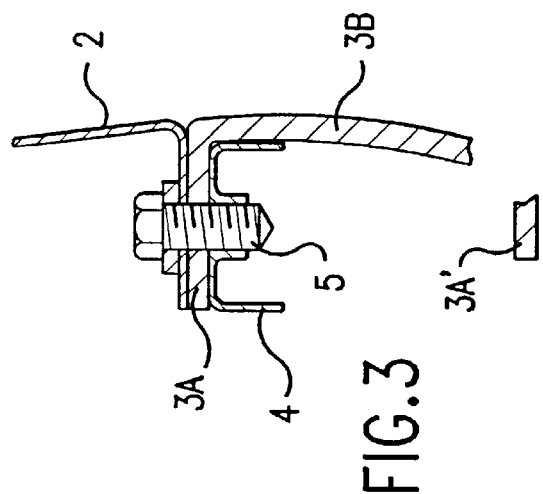

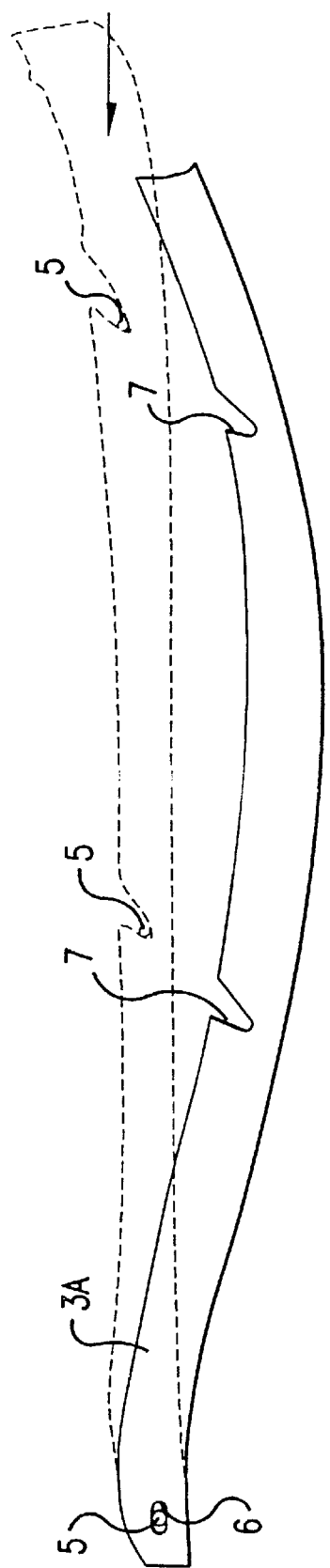
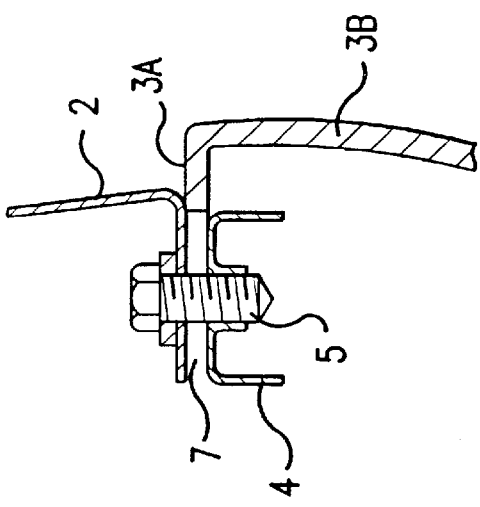

BOLT-ON PART, ESPECIALLY A BUMPER OF A MOTOR VEHICLE

BACKGROUND AND SUMMARY OF THE INVENTION

This application claims the priority of application 197 14 118.8-21, filed Apr. 5, 1997 in Germany, the disclosure of which is expressly incorporated by reference herein.

The invention relates to a bolt-on part, especially a front or rear bumper, of a motor vehicle that can be exposed especially in its outer area to impact energy and is mounted pointwise on a structural member on the vehicle, with the connection between the structural member and the bolt-on part comprising approximately pin-shaped mounting devices at one of the two parts to be connected and recesses on the other of the two parts, whereby in addition at least one of the recesses is enclosed circumferentially and is located at an end of the bolt-on part that is located furthest away from the point where the impact energy is applied in the direction of its action, while the other recesses are made open circumferentially.

Such a bolt-on part is known for example from Japanese Patent Document JP 071 37 585A.

In a bolt-on part of the type mentioned above, the invention is concerned with the problem, during an application of force caused by an impact, of avoiding deformation of the motor vehicle parts to which the bolt-on part is connected, up to an amount of impact energy that is as high as possible.

One solution to this problem is offered by a bolt-on part of the type mentioned above, wherein the circumferentially open recesses are in the form of grooves that are inclined by less than $\alpha=90°$ to the direction of action of the impact energy.

The invention is based on the idea of permanently connecting the bolt-on part only at the end opposite the end that is exposed to a possible impact, to a structural member of the motor vehicle, while the remaining area is intended to be capable of shearing at the structural member on the motor vehicle. The shearing area is intended to deform in the shape of an arc and in the process to absorb as much of the deformation energy as possible to reduce the impact energy. The type of fastening that permits the shearing described above is provided by grooves that extend at an angle and are formed in the bolt-on part in such fashion that no hinge-like bending of the bolt-on part can take place in the groove areas during deformation caused by an impact. As a result of the inclined fastening of the mounting grooves, a certain amount of tolerance compensation in the lengthwise direction is possible when mounting on a part of the motor vehicle, if the mounting devices at the end of the bolt-on part are designed accordingly, with a recess that is enclosed all the way around. Such a design is achieved in the simplest fashion by a recess in the mounting devices that is in the shape of an elongate hole, for example.

As a result of the mounting grooves being at an angle, the bolt-on part is secured in a stable and nonbendable position with respect to the structural member to which it is connected, in a state in which it is not displaced lengthwise, in other words a state that is not influenced by an impact in the lengthwise direction.

The invention is especially advantageous in a U-shaped bolt-on part in which the recesses are located internally in the free legs and an impact is received in the direction of the legs, which is made on the closed U-area of the bolt-on part.

Other objects, advantages and novel features of the present invention will become apparent from the following detailed description of the invention when considered in conjunction with the accompanying drawings.

BRIEF DESCRIPTION OF THE DRAWINGS

FIG. 2 is a top view of a side flange of the bumper according to FIG. 1 with the indicated retaining pins of a structural member that receives the bumper in a motor vehicle and is not shown in this figure;

FIG. 3 is a section through a mounting location on the bumper along line III—III in FIG. 1;

FIG. 4 is a section through mounting locations :of the bumper along line IV—IV in FIG. 1;

FIG. 5 is a diagram of a bumper flange according to FIG. 1 in a sheared state following an impact on the closed U-area of the bumper, with simultaneous indication of the nondeformed state by dotted lines; and FIG. 6 is a section through a mounting location of the side flange of the bumper along line IV—IV in FIG. 1, in a state of the bumper that is deformed as in FIG. 5.

DETAILED DESCRIPTION OF THE DRAWINGS

Figure 1:
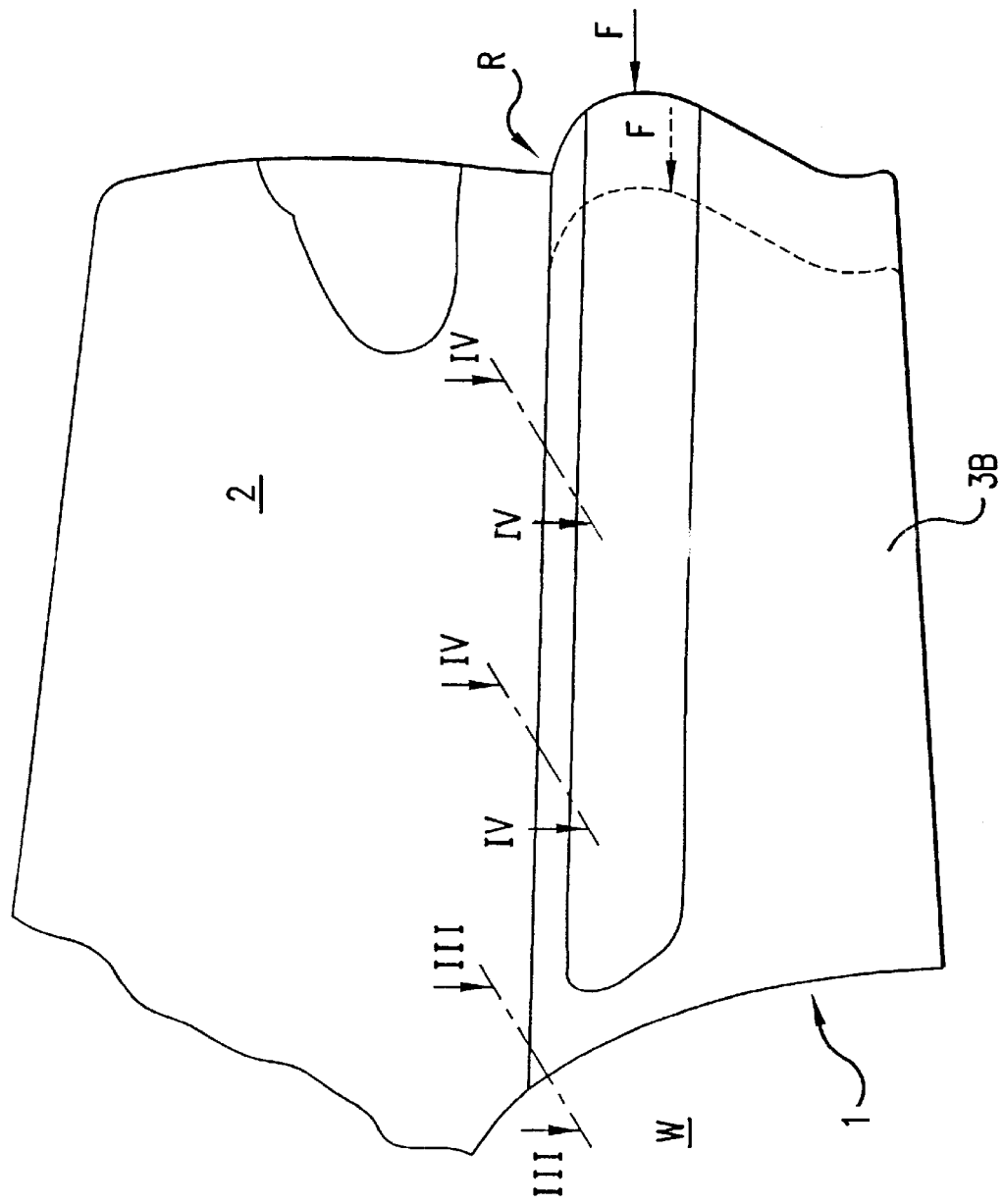
FIG. 1 is a side view of a rear bumper on a fender of a motor vehicle, in an arrangement according to a preferred embodiment of the present invention.

A rear bumper 1 is arranged in a certain fashion as indicated in FIG. 1 relative to rear fender 2 of a vehicle which extends from a rear vehicle end R forwardly toward a vehicle rear wheel W. Bumper 1 generally has the shape of a U and is composed of two freely extending flanges 3A, 3A', which can be seen as the free legs of the U. The closed area of the U is the closed connecting area 3B of bumper 1. In the present example it is assumed that this area is subjected to an impact energy indicated by an arrow F.

Flange 3A of bumper 1 is fastened to respective fender 2 by a mounting rail 4 of the vehicle. This fastening takes place in the example shown by bolts 5 that engage mounting rail 4, said bolts being guided through mounting receptacles in the form of recesses in fender 2 and also in bumper flange 3A. When bolts 5 are tightened, fender 2 and bumper flange 3A are connected to one another forcewise.

Two types of recesses are provided in bumper flange 3A. One type consists of a closed recess in the form of an elongate hole 6 at the end of bumper flange 3A for example. Instead of a single elongate hole 6, a plurality thereof can also be provided in the end area of bumper flange 3A.

In the remaining area of bumper flange 3A, in other words outside its free end area, the recesses are in the form of grooves 7 extending outward and open at the top. These grooves 7 are inclined at an angle α relative to the closed bumper area in the plane covered by flange 3A of bumper 1 together with the opposite flange, not shown, of U-shaped bumper 1. This inclination is advantageously approximately α=40°.

The way in which a bumper 1 mounted in the manner described above shears in its flange areas during a rear impact, as indicated by arrow F, is shown in FIG. 5. FIG. 6 shows the nature of the mounting of the bumper flange 3A in areas IV—IV in a flange area that has been sheared as shown in FIG. 5.

Grooves 7 have a V-shaped opening cross section. The shape of the opening cross section can be different than illustrated according to other contemplated embodiments.

Force measurements at 15 km/h, in a bumper designed according to the invention and fastened according to the invention, with a 40% offset rear impact, have a much reduced force introduction into the body wall of the vehicle at the body. In a test conducted in this fashion, a threefold reduction by comparison to a solid connection was achieved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Bolt-on part of a motor vehicle that can be exposed to impact energy and which is mounted on a structural member of the vehicle, with a connection between the structural member and the bolt-on part comprising bolts which can be received in recesses in the bolt-on part and in at least one hole which is enclosed circumferentially and located in the bolt-on part at an end of the bolt-on part that is furthest away from a point at which the impact energy is applied in a direction of its action, the recesses being open circumferentially, wherein the recesses are in the form of grooves that are inclined by a slope angle $\alpha$ of less than 90° relative to the direction of action of the impact energy and said bolt-on part is permanently connected to the structural member only at said end of the bolt-on part that is furthest away from said point at which impact energy is applied.

2. Bolt-on part according to claim 1, wherein the recesses are located in a lateral flange defined on the bolt-on part.

3. Bolt-on part according to claim 1, wherein the slope angle $\alpha$ of the grooves is approximately 40°.

4. Bolt-on part according to claim 1, wherein the grooves have an approximately V-shaped opening cross section.

5. Bolt-on part according to claim 1, wherein the bolt-on part is made U-shaped and the recesses are located in a U-leg flange of the bolt-on part.

6. Bolt-on part according to claim 1, wherein said bolt-on part is a front bumper of said motor vehicle.

7. Bolt-on part according to claim 1, wherein said bolt-on part is a rear bumper of said motor vehicle.

8. Bolt-on part according to claim 2, wherein the slope angle $\alpha$ of the grooves is approximately 40°.

9. Bolt-on part according to claim 2, wherein the grooves have an approximately V-shaped opening cross section.

10. Bolt-on part according to claim 2, wherein the bolt-on part is made U-shaped and the recesses are located in a U-leg flange of the bolt-on part.

11. Bolt-on part according to claim 3, wherein the grooves have an approximately V-shaped opening cross section.

12. Bolt-on part according to claim 3, wherein the bolt-on part is made U-shaped and the recesses are located in a U-leg flange of the bolt-on part.

13. Bolt-on part according to claim 4, wherein the bolt-on part is made U-shaped and the recesses are located in a U-leg flange of the bolt-on part.

14. Bolt-on part according to claim 8, wherein the bolt-on part is made U-shaped and the recesses are located in a U-leg flange of the bolt-on part.

15. Bolt-on-part according to claim 8, wherein the grooves have an approximately V-shaped opening cross section.

16. Bolt-on part according to claim 15, wherein the bolt-on part is made U-shaped and the recesses are located in a U-leg flange of the bolt-on part.

* * * * *